United States Patent Office.

ROBERT ALEXANDER, OF EUGENE CITY, OREGON.

Letters Patent No. 77,343, dated April 28, 1868.

IMPROVED MEDICAL COMPOUND.

The Schedule referred to in these Letters Patent and making part of the same.

TO ALL WHOM IT MAY CONCERN:

Be it known that I, ROBERT ALEXANDER, of Eugene City, Lane county, and State of Oregon, have invented a new and improved Mode of Curing Cancer; and I hereby declare that the following is a full and accurate description of my compounds and mixtures of medicines for the cure of cancer.

The compound mixture, No. 1, is composed of caustic of potash and chloroform, applying the chloroform to the caustic until it is reduced to a liquid or ointment.

The mixture or compound, No. 2, is composed of the following mixture: To seventy-five grains of caustic of potash, add twenty-five grains of the nitre of silver; then add a liquid mixture, consisting of three-fourths chloroform and one-fourth nitric acid, to the caustic, until it is reduced to a liquid or ointment.

The mixture or compound, No. 3, consists of a black salve that is made from either the stalk, leaves, or berries of a weed known as polk-stalk. It is made by extracting the liquid from the polk, and evaporating in the sun in an earthen vessel.

The mixture or compound, No. 4, consists of acrimonial powders, which are made from the Indian or wild turnip, by drying the root in the shade, and then grinding it into a powder.

The compounds, Nos. 1 and 2, are anodyne in their effects, preventing pain, at the same time penetrating, so as to kill the tumor.

The compounds, Nos. 3 and 4, are designed to extract cancer-humor, and heal the sore.

What I claim as my invention, and desire to secure by Letters Patent, is—

The combination of the foregoing mixtures of medicines, to be used for the cure of cancer in the human system.

ROBERT ALEXANDER.

Witnesses:
   A. A. SKINNER,
   JOEL WARE.